United States Patent [19]

Akerson

[11] Patent Number: 4,742,441
[45] Date of Patent: May 3, 1988

[54] HIGH FREQUENCY SWITCHING POWER CONVERTER

[75] Inventor: Steven C. Akerson, Kent, Wash.

[73] Assignee: Heart Interface Corporation, Kent, Wash.

[21] Appl. No.: 934,247

[22] Filed: Nov. 21, 1986

[51] Int. Cl.$^4$ ............................................ H02P 13/18
[52] U.S. Cl. ........................................ 363/97; 363/89;
363/127; 363/131; 363/134; 363/56
[58] Field of Search ...................... 363/24–26,
363/56, 89, 97–98, 127, 133–134, 131

[56] References Cited

U.S. PATENT DOCUMENTS

| | | | |
|---|---|---|---|
| 3,514,688 | 5/1970 | Martin | 363/127 X |
| 4,099,109 | 7/1978 | Abbondanti | 318/227 |
| 4,105,939 | 8/1978 | Culbertson | 363/137 X |
| 4,150,425 | 4/1979 | Nagano et al. | 363/56 |
| 4,257,108 | 3/1981 | Igel | 364/900 |
| 4,290,108 | 9/1981 | Woehrle et al. | 363/41 X |
| 4,396,909 | 8/1983 | Suzuki | 307/265 X |
| 4,399,499 | 8/1983 | Butcher et al. | 363/127 X |
| 4,415,861 | 11/1983 | Palmquist et al. | 307/265 X |
| 4,466,052 | 8/1984 | Thrap | 363/41 |
| 4,513,387 | 4/1985 | Neyer | 364/718 |
| 4,600,984 | 7/1986 | Cohen | 363/26 X |

Primary Examiner—Peter S. Wong
Attorney, Agent, or Firm—Kolisch, Hartwell & Dickinson

[57] ABSTRACT

A high-frequency switching power conversion circuit is disclosed. The circuit is capable of operating either as an inverter or as a rectifier, by the use of an array of high-power, bidirectional switches. AC waveforms are produced by ROM-based pulse width modulation, the clocking of which may be phase-locked to an active AC load. Analog voltage sense circuitry detects high or low output voltage and alters the base address in ROM to a lower or higher duty cycle waveform, respectively, providing digital regulation of the output. Overcurrent protection circuitry, responsive to an inductive load, alters the pulse width modulation pattern to produce a dynamically clamped output dependent upon high-power, variable frequency loads. No-load detection circuitry drastically reduces the duty cycle on the switching elements, thus conserving energy when not needed.

20 Claims, 5 Drawing Sheets

HIGH FREQUENCY SWITCHING POWER CONVERTER

BACKGROUND AND SUMMARY OF THE INVENTION

This invention relates generally to a high frequency switching power converter, and more particularly to a switching converter capable of concurrently inverting and rectifying. A preferred embodiment is described in which the switching power converter may provide the interface between a DC wind generator or solar panel array and a conventional AC power grid.

The switching power converter circuit takes the form of a high frequency switching inverter, implemented with bidirectional switches capable of blocking negative voltages to enable rectification of AC power as well as inversion of DC power. This is accomplished by providing a transformer whose primary winding is center-tapped and conventionally inverted by switching devices, high power field-effect transistor (FET) switching circuitry connected between the transformer's secondary and current storage means, and a digital switch controller that generates pulse width modulated (PWM) signals for synchronizing the conventional inverter and the high power switching circuitry. The circuit may be connected between a DC source and an AC load, between a DC load and an AC source, or between more general DC and AC elements The switching power converter may, therefore, be used as both a battery charger and an AC source.

Switching inverters are frequently used to power an AC appliance from a DC source, e.g. batteries or solar arrays. Inductive AC loads, e.g. motors, require relatively high starting currents usually provided by high power inverters. Typically, high current is required only during the start-up of the motor, thus much of the capacity of the conventional high power inverter is wasted once the motor reaches a steady state operating condition. Such high power inverters are generally linear rather than switching devices, rendering them relatively costly and inefficient. When the inverter's DC power source fails, the AC appliance ceases to operate.

The typical rectifier circuit enables the supply of DC power from an AC source. A rectifier can be used, for example, to recharge a battery or directly to drive a DC appliance from an AC line. The charging of a battery using a rectifier requires vigilance on the part of the operator, as batteries are susceptible of exploding when overcharged. Trickle charging of batteries, sometimes referred to as "topping," is a tedious process, and removes the DC power supply from operation for quite some time. Charging a battery generally requires the removal of the DC power supply from its operating environment.

The problems associated with using an inverter to convert battery power for use by an AC appliance, and using a separate rectifier to convert AC power for recharging a discharged battery are numerous. At the very best, this dual purpose may be served by conventional means only with manual intervention. For example, if it is determined that the battery has discharged, it is necessary to remove the battery from the circuit to which it supplies power and then to connect it to the rectifier for recharging. Integral converter means by which one may automatically convert DC power to AC power and vice versa have been theorized but are heretofore unrealized.

In the preferred embodiment of the instant invention, a switching converter circuit is provided that has a transformer with a center-tapped primary connectable to the positive terminal of a DC power supply. The end taps of the primary are controllably alternately connected to the negative (or common) side of the DC power supply, providing alternately polarized stepped-up voltage pulses on the transformer's secondary winding.

An array of bidirectional power FET switches is controlled synchronously with the primary's switches alternately to supply positive and negative PWM signals to the two input terminals of an inductor. The PWM signals are provided by a programmable ROM-based table of values. Thus, the PWM waveform may represent a sinusoid or any other desired symmetric shape.

The ROM contains a number of tables representing waveforms of various amplitudes. Analog sense circuitry provides feedback to decision logic that, in turn, selects a base address in ROM for a higher or lower amplitude waveform Thus ROM-based digital regulation is provided, dynamically responsive to a variable load. A no-load sensing circuit automatically selects a ROM base address of a table containing a reduced pulse width and duty cycle control signal for the power FET switch array.

High current protection also is provided, by a circuit that senses when the power through the power FET switches exceeds a predefined level. When it does, the digital pulse stream used to control the power FET switches is altered to produce a clamped sinusoidal output.

Each switch in the power FET switch array is powered independently from any other and from ground by a separate tap on the transformer's secondary coil. While blocking reverse voltages, each switch is capable, by virtue of an integral shunted diode, of conducting current in either direction. This novel feature allows the switches to operate bidirectionally, and allows the converter circuit, in turn, to act concurrently as both inverter and rectifier.

It can be seen that such a circuit provides for efficient, automatic inversion and rectification, as required in interfacing DC and AC power grids. When, for example, the DC power grid has more capacity than the AC power grid, phase-locked AC power may be supplied to the AC grid. Similarly, when the AC power grid has more capacity than the DC power grid, DC power may be supplied to the DC grid. When connected between a DC power supply and a reactive load, the dynamic clamping feature will protect the circuit's power switches while responding to the variable load. The switching nature of the converter makes it energy efficient and cool in operation. These and other objects and advantages of the present invention will be more clearly understood from a consideration of the drawings and the following description of the preferred embodiment.

DETAILED DESCRIPTION OF THE INVENTION

Figure 1:
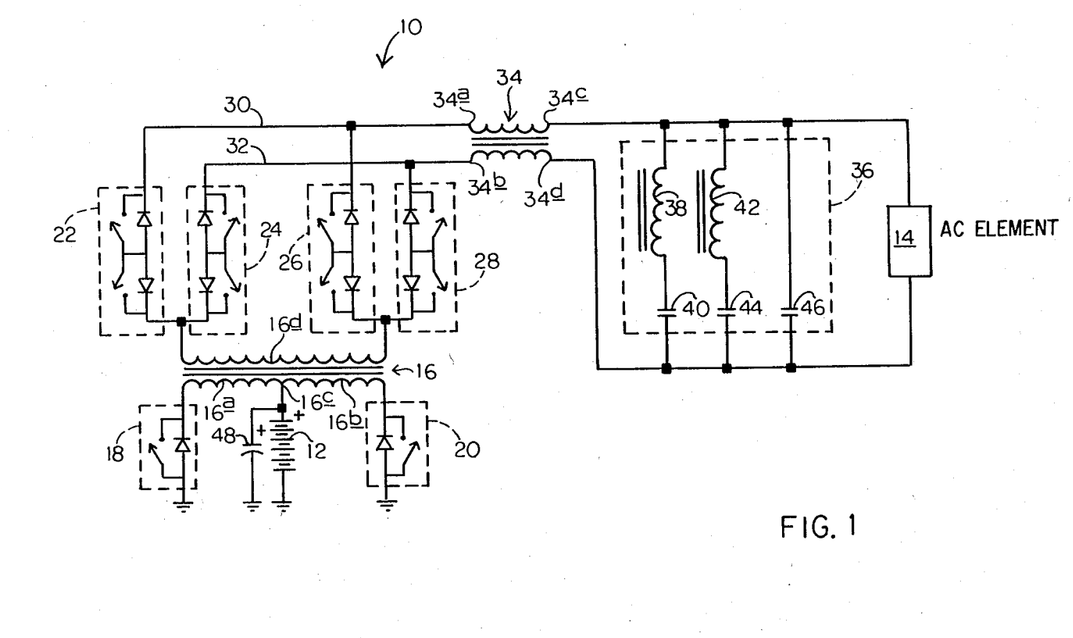
FIG. 1 schematically illustrates the preferred embodiment of the invention, showing a simplified (equivalent) converter circuit in a typical application.

Referring first to FIG. 1, a converter circuit configured in accordance with the invention, and illustrated in simplified schematic form, is shown generally at 10. A DC element, or battery, 12 and an AC element 14 are shown in a typical application of the circuit disclosed herein. In the preferred embodiment, battery 12 is connected between DC ground and the center tap of transformer 16. Transformer 16 has a primary coil on either side 16a, 16b of its center tap 16c. Secondary coil 16d has a turns ratio N relative to each of the primary windings 16a, 16b. One side of the primary coil is connected through high current switching device 18, discussed in more detail below, to ground. The other side of the primary coil is connected through high current switching device 20 to ground. By controllably, alternately closing switches 18 and 20, an alternating polarity voltage, equal to N times the voltage of the battery 12, is induced in secondary transformer winding 16d.

Connected to either end tap of secondary coil 16d are high voltage, bidirectional switching devices 22, 24, 26, 28, whose detailed implementation and operation will be fully explained below. This array of bidirectional switching devices permits the synchronously controlled operative connection of the secondary coil's end taps to high line 30 and low line 32, connected in turn to input terminals 34a, 34b of current storage means, or inductor 34. By controllably pulse width modulating the sequenced closures of switches 22, 24, 26, 28 at a predefined switching frequency and duty cycle, an AC voltage may be impressed across the inductor's input terminals 34a, 34b.

An integrated waveform will appear at output terminals 34c, 34d of the inductor, and will contain odd harmonic components of the switching frequency. These harmonic components, known as harmonic distortion, may be filtered by tuned trap filter network 36. In the preferred embodiment, filter network 36 takes the form of series connected inductor 38 and capacitor 40, and series connected inductor 42 and capacitor 44. It will be appreciated that these filters may be tuned to remove, respectively, the third and fifth harmonic components of the switching frequency. Capacitor 46 is effective to remove all but the negligible of the remaining (seventh and higher) harmonic components. Thus, a virtually distortion-free AC voltage is presented, by virtue of the converter circuit disclosed herein, to AC element 14.

Referring still to FIG. 1, the operation of switches 18, 20, 22, 24, 26, 28 will now be described. A switch controller (not shown in FIG. 1, but discussed in detail below with reference to FIG. 2) synchronizes the opening and closing of the switches. When switches 18, 20 are both open, switches 22, 24, 26, 28 are all closed. This shorts high line 30 to low line 32. When switch 18 closes, switches 22, 28 open while switches 24, 26 remain closed. This causes a positive voltage of N times the voltage of the battery 12 to appear on high line 30 with respect to low line 32. When switch 18 opens again, switches 22, 24, 26, 28 simultaneously close. When switch 20 closes, switches 24, 26 open while switches 22, 28 remain closed. As before, this causes a positive voltage of N times the voltage of the battery 12 to be imposed on high line 30 with respect to low line 32.

Referring still to FIG. 1, the sequencing of switches 22, 24, 26, 28 with respect to switches 18, 20 is further explained. The synchronization of the switches is changed periodically, for example, one hundred twenty times per second. Now, when switch 18 closes, switches 24, 26 open. When switch 20 closes, switches 22, 28 open. This produces the same results as those described above, but with the opposite polarity, i.e. low line 32 is now positive with respect to high line 30. With the synchronization changing one hundred twenty times per second, the voltage between high line 30 and low line 32 will be an alternating voltage of 60 Hz. If the duty cycle were maintained constant, then this alternating voltage would be a 60 Hz square wave of an amplitude in accordance with the following equation:

$$V_{30,32} = V_b \times N \times D, \text{ where:}$$

$V_{30,32}$ is the voltage between high line 30 and low line 32;

$V_b$ is the voltage across battery 12; and

D is the duty cycle of the switch pairs 22, 28 and 24, 26.

By varying the duty cycle through each half-cycle, the alternating voltage at the output terminals of inductor 34 may be of any desired wave shape. In the preferred embodiment, this duty cycle is varied by pulse width modulation to produce a sine wave. It will be appreciated that, within the spirit of the invention, the 60 Hz operating frequency may be any desired frequency, the wave shape may be any half-cycle symmetric wave shape, and the switching frequency may be within the range of operability of the switching devices and the transformer.

Importantly, the device of the present invention is capable of transferring energy in either direction, i.e., from battery 12 to AC element 14, or from AC element 14 to battery 12. This is a result of the unique bidirectionality of switches 22, 24, 26, 28, which will be explained more fully below. Briefly stated, the bidirectional switches are capable of conducting current in either direction while blocking negative voltages. The result is that the converter circuit disclosed herein may operate in two modes: as an inverter, or as a rectifier. When the circuit is operating as an inverter, synchronized closures of switches 22, 24, 26, 28 effectively impress, alternately, a positive and a negative voltage of varying amplitude across the input terminals to inductor 34, with current flowing from transformer 16 to inductor 34. By phase-locking the switch controller to an active AC element, the circuit acts as a full-wave rectifier, with current flowing from inductor 34 to transformer 16. If the AC element is an inductive load, for example, the circuit will operate as a battery charger during part of each cycle. Thus, the converter circuit is capable of driving a reactive load of any power factor. This feature is especially useful in driving high-power, variable speed AC motors, e.g., those found in high-torque conveyer systems.

Figure 2:
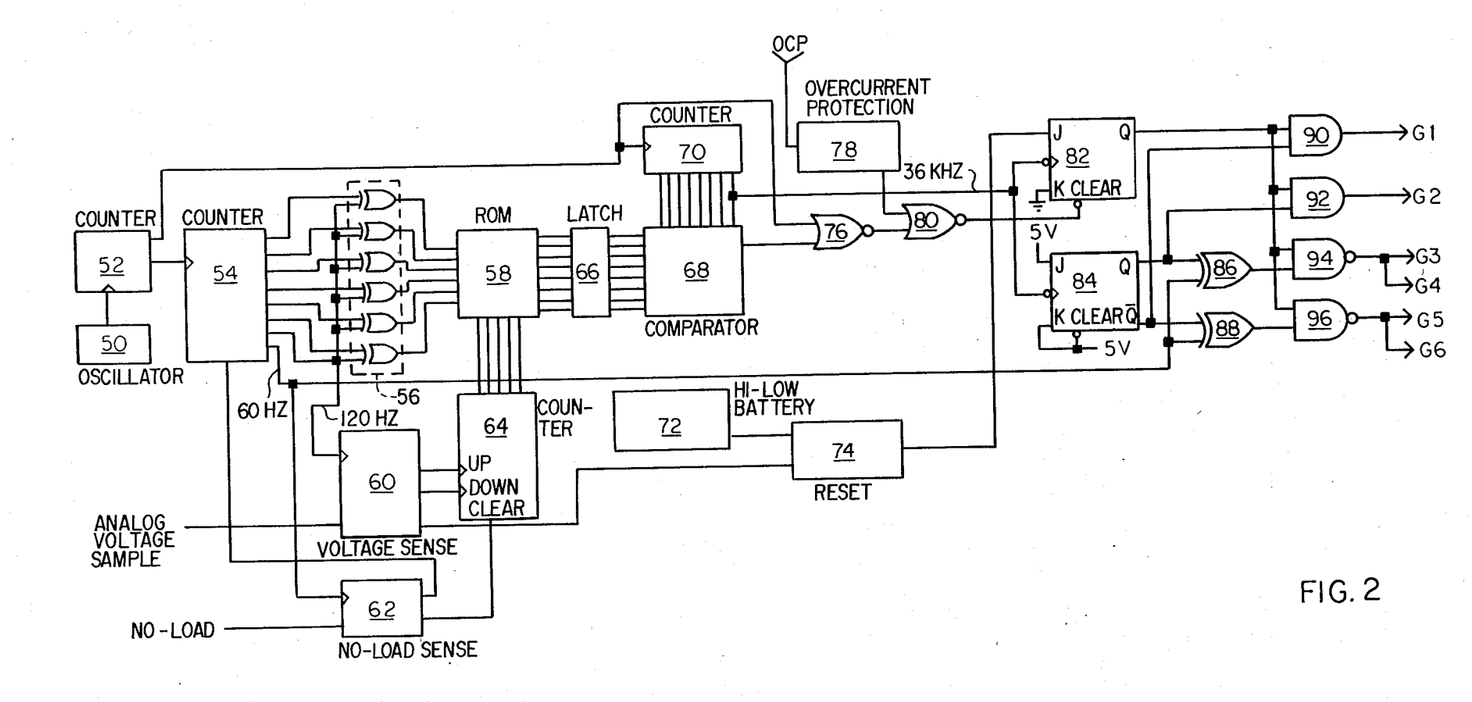
FIG. 2 is a block-level diagram of the circuit used to control the power switches of FIG. 1.

Turning next to FIG. 2, the switch controller, whose operation is explained above, is diagrammed. Simply stated, the switch controller tells switches 18, 20, 22, 24, 26, 28 when to open and close. In the preferred embodiment, an 18.432 MHz oscillator 50 is divided down by counters 52, 54 to provide a 60 Hz square wave signal as the most significant bit (MSB) output of counter 54. The six least significant bits (LSB) from counter 54 are connected to the inputs of an EXCLUSIVE OR gate array 56. The other input to each of the EXCLUSIVE OR gates in array 56 is the 120 Hz square wave output of counter 54. The outputs of the EXCLUSIVE OR gate array 56 sequence through a binary count from 0 to 63 and then from 63 back to 0.

The outputs of the EXCLUSIVE OR gate array are connected to the six LSB address lines of a ROM 58, which is programmed with waveform attributes representing the desired output waveform. Sets of sixty-four consecutive addresses in ROM contain eight-bit binary representations of a PWM stream corresponding to a quarter-cycle of the desired 60 Hz output. Any one of thirty-two quarter-cycle waveform representations may be selected, depending on the five MSB address inputs to the ROM, as will be discussed later. The output of the ROM 58 is latched at 66 and presented to the inputs of digital comparator 68.

The divide-by-two output of counter 52 is further divided down to 36 KHz ($K=2^{10}$) by counter 70. Thus, 36K times per second, counter 70 counts up from 0 to 255. Its outputs are presented to the other input of digital comparator 68. So long as the count is less than the latched ROM value, the output of the digital comparator 68 that is connected to NOR gate 76 will be logic one or high, holding the output of NOR gate 76 low. When the output of counter 70 reaches the value of the latched ROM output, this input to NOR gate 76 goes low. This enables the next low going clock input to counter 70 to feed through NOR gate 76, presenting a high pulse to the input of NOR gate 80. Regardless of the state of the output of the protection circuit 78, which will be discussed below, this will produce a low pulse on the low-active clear input of J-K flip-flop 82. The output of flip-flop 82 is connected to the input of AND gates 90, 92 and NAND gates 94, 96 which, in turn, control switches 18, 20, 22, 24, 26, 28.

The 36 KHz output of counter 70 sets the output of flip-flop 82 high 36K times per second, unless reset circuit 74 has detected a high or low battery condition, via detection circuit 72, or an overvoltage condition via voltage sensing circuitry 60. Thus, the output of flip-flop 82, in normal operation, represents the PWM switch control signal, whose frequency is 36 KHz and whose pulse widths are determined by a programmed table of ROM values. J-K flip-flop 84 is connected as a toggle flip-flop, whose output is an 18 KHz square wave. Complementary outputs of this flip-flop are input to AND gates 90, 92, producing complementary control signals for switches 18, 20.

One hundred twenty times per second, output voltage sensing circuitry 60 determines whether the pulse width modulation should be increased or decreased to raise or lower the amplitude of the output. Up/down counter 64, initially cleared, presents a five-bit coded base address (in phase with zero-crossing of the 60 Hz operating frequency) to ROM 58, to select one of thirty-two possible quarter-cycle waveform tables. ROM 58 may contain a number of tables corresponding to higher and lower amplitude outputs, and varying wave shapes. For example, shown at 62 is a load-sensing circuit which, synchronous with the operating frequency, clears up/down counter 64 to select a special base address in ROM. At this address, a special table has been programmed, which contains drastically reduced pulse width attributes. Thus, when a no-load condition is detected, the switch controller greatly reduces the duty cycle on the high power switching devices. Finally, EXCLUSIVE OR gates 86 and 88 change the synchronization of switches 22, 28, and 24, 26, to produce the alternating output.

Figure 3:
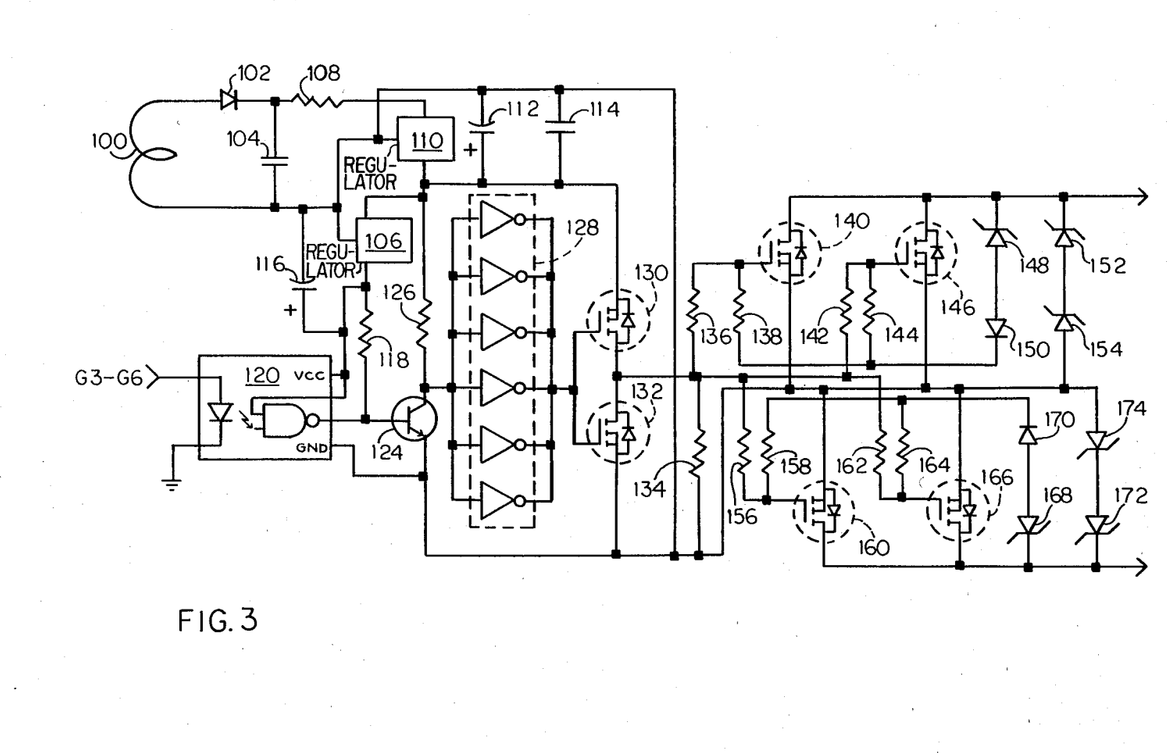
FIG. 3 is a device-level schematic of a bidirectional switch shown equivalently in FIG. 1.

Referring now to FIG. 3, the implementation of bidirectional switches 22, 24, 26, 28 is described. The device level schematic of FIG. 3 is, in practice, repeated once for each of the bidirectional switches shown in FIG. 1. Winding 100 of transformer 16 isolates each bidirectional switch from ground and from each other, while providing a source of power for the switching circuitry. One end of winding 100 is connected to the anode of a diode 102, whose cathode is connected to one end of capacitor 104. The other end of capacitor 104 is connected to the other end of winding 100, and to one input of a three-terminal, five-volt regulator 106. The cathode of diode 102 is also connected, through resistor 108, to three-terminal, fifteenvolt regulator 110. The output of this regulator is decoupled through capacitors 112, 114 and used to provide isolated 15 V power. Regulator 106 provides isolated 5 V power, decoupled by capacitor 116, for opto-isolator 120. The anode side of the light-emitting diode in opto-isolator 120 is driven by the respective switch controller output discussed above.

When the switch controller output goes high, with respect to logic ground, opto-isolator 120 drives the base of transistor 124 low. With transistor 124 off, its collector, which is connected through resistor 126 to voltage regulator 110, is driven to 15 V. This drives the output of inverters 128 low, turning FET 130 on and FET 132 off. As the drains of FETs 130, 132 are driven to 15 V, FETs 140, 146, 160, 166 are turned on. When the switch controller input to opto-isolator 120 goes low, the opposite happens: FETs 140, 146, 160, 166 turn off.

Resistor 134 is used to prevent static damage of the FETs during construction of the circuit. A typical value used is 100 K ohms. Resistors 136, 138, 142, 144, 156, 158, 162, 164 prevent high speed oscillations between the gates of the parallel FETs 140, 146, and 160, 166. The values of these resistors is typically between twenty and thirty ohms. One hundred sixty volt Zener diode pairs 152, 154, and 172, 174 protect their respective FET pairs from being damaged from high-voltage spikes. Three hundred twenty volt Zener diodes 148, 168, in combination with series anode connected diodes 150, 170, further prevent damage from high-voltage spikes by turning the respective FETs on just enough to suppress the spike. In the preferred embodiment, the FETs are heat-sinked and are chosen for their considerable power handling capability. It will be appreciated that more FETs similarly may be paralleled for more power handling capability.

Figure 4:
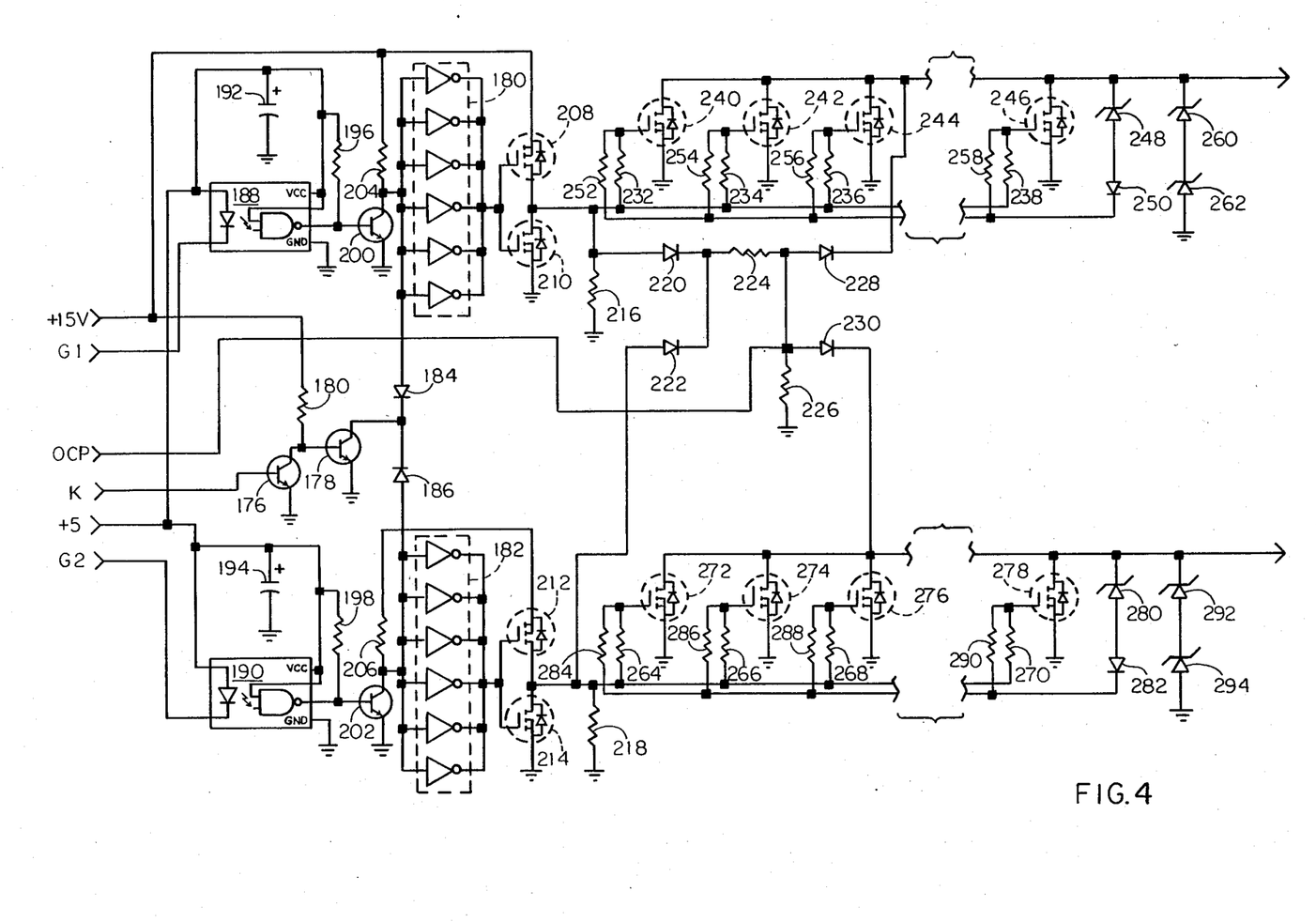
FIG. 4 is a device-level schematic of the unidirectional switches shown equivalently in FIG. 1.

Turning now to FIG. 4, a device level schematic of the unidirectional switches 18, 20 of FIG. 1 is shown. Two regulated voltages, 15 V and 5 V are needed to drive switches 18, 20. A start-up protection circuit (not shown) drives the base of transistor 176, causing it to conduct, only when the battery 12 is supplying a predefined level of positive voltage. When transistor 176 is conducting, the base of transistor 178 is held low through resistor 180, which is connected to 15 V. As long as its base is low, transistor 178 will be off and its collector will enable inverter arrays 180, 182 through diodes 184, 186. Opto-isolators 188, 190 are driven, by the switch control signals corresponding to switches 18, 20, respectively. The output of opto-isolators 188, 190 are connected to plus 5 V, and are decoupled by capacitors 192, 194, through resistors 196, 198. The opto-isolators also drive the bases of common emitter transistors 200, 202. The collectors of transistors 200, 202 are biased through resistors 204, 206 to 15 V. The collectors of transistors 200, 202 drive, respectively, the input to inverter arrays 180, 182.

Referring still to FIG. 4, the output of inverter arrays 180, 182 drive the gates of FET pairs 208, 210, and 212, 214, respectively. FETs 208, 210 are common drain connected, with the source of FET 208 being connected to 15V and the source of FET 210 being connected to ground. These common drain pairs are connected through resistors 216, 218 to ground, and are summed through diodes 220, 222 and resistor 224 to indicate to the protection circuit of FIG. 2 an overcurrent condition of switches 18 or 20. Resistor 224 is also connected to resistor 226, the other side of which is grounded. Finally, resistor 224 is connected to the anode of diodes 228, 230, whose cathodes are connected to the common drains of the FET array to be described directly below.

The following discussion of the FET array will be understood to apply both to switch 18 and to switch 20, as the FET arrays are implemented identically. With respect to switch 18, the common drains of FETs 208, 210 drive, through resistors 232, 234, 236, 238, the gates of a number of parallel connected common source FETs, such as those indicated at 240, 242, 244, 246, respectively. It will be appreciated that, for the sake of clarity, all such FETs have not been shown. In the preferred embodiment, ten FETs make up each switch's array. The common drains of this FET array are fed back through the combination of 36 V Zener diode 248 and diode 250, and through resistors 252, 254, 256, 258 to the gate of FETs 240, 242, 244, 246, respectively. Series connected 20 V Zener diodes 260, 262 are connected as in the bidirectional switches of FIG. 3.

The parallel FET array of switch 20 includes identically connected devices, including: resistors 264, 266, 268, 270, 284, 286, 288, 290; FETs 272, 274, 276, 278; Zener diodes 280, 292, 294; and diode 282. The number of FETs in each switch array is, in the preferred embodiment, the same, i.e. ten. It will be appreciated that the common drains of the FET array corresponding to switch 18 are connected, as shown in FIG. 1, to left primary coil 16a, and the common drains of the FET array corresponding to switch 20 are connected to right primary coil 16b.

Figure 5:
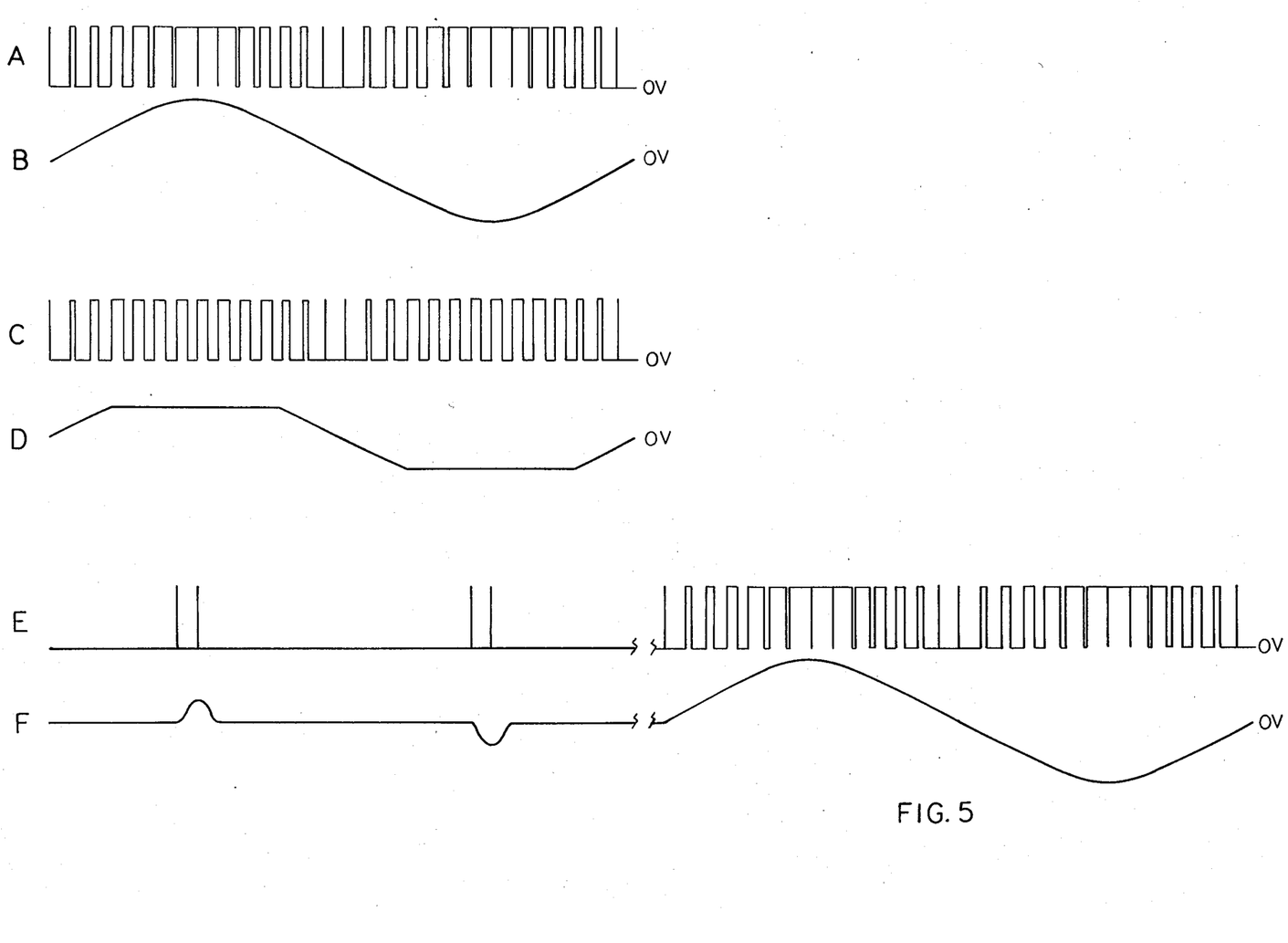
FIG. 5 shows selected waveforms illustrative of the operation of the circuit.

Turning now to FIG. 5, various voltage waveforms are illustrated corresponding to the converter circuit's operation. Waveform A is a simplified schematic depiction of a PWM pulse stream, corresponding to one full cycle of a sine wave. It will be appreciated that waveforms A, C and E show, for the sake of clarity, an order of magnitude fewer switching intervals/period than the circuit produces in operation. Waveform B shows the corresponding regulated alternating voltage corresponding to waveform A. Waveform C shows, similarly simplified, a PWM pulse stream, wherein the pulse width of the pulse stream has been altered near in time to alternate, half-cycle peaks in response to an overcurrent condition of the high-power FET switches. Corresponding with waveform C is the resulting waveform D which shows the dynamically clamped AC output responsive to, for example, a motor that is being started. It will be appreciated that the dynamic clamping feature is continuously responsive to such an inductive load, so that, while only a single cycle of such a waveform is shown, the waveform would in fact progressively approach the unclamped output shown in waveform B as, for example, the motor approaches full speed.

Waveform E schematically illustrates alteration of the base address of the ROM in the presence of a no-load condition. Fragmentarily shown at the left of waveform E is a single cycle of the digital pulse stream produced by this part of the ROM table, and shown fragmentarily on the right is a digital pulse stream corresponding to that of waveform A in which, at some later time, the no-load condition is removed. Waveform F, corresponding to waveform E, represents the AC output under a no-load, and under a load, condition. It will be appreciated that with this drastically reduced power output, energy conservation is realized by the high-power switching devices of the present invention.

The advantages offered by the invention should be apparent to those skilled in the art. By the selectively controllable operation of a set of unidirectional high current FET switches in a conventional inverter fashion, and an array of high voltage bidirectional FET switches, unconventionally, operatively, alternately connecting the end taps of a transformer secondary to the input terminals of an inductor, applicant makes possible the realization of a power converter circuit capable of operating as either an inverter or as a rectifier.

Such a circuit may drive reactive AC loads of any power factor. The converter may be used, as well, to power an AC appliance with a higher start-up power requirement than the power rating of the converter, and, once started, the AC appliance may be run in its steady state. Importantly, the circuit may provide the interface between a DC and an AC power grid. It will be appreciated that sense-circuitry may be added to detect when the AC power grid is incapacitated, to switch from rectification to inversion, thus supplying power to the AC grid from a local, recharged array of batteries.

Accordingly, while a preferred embodiment of the invention has been described herein, it is appreciated that further modifications are possible to come with the scope of the invention.

It is calimed and desired to secure by Letters Patent:

1. A swithing power converter circuit usable with a DC element and an AC element, comprising:
   selectively bidirectionally operative power converter means having signal controlled switching devices whose selected operations collectively configure said converter means to act in one mode as an inverter capable fo converting DC power supplied by such DC element to AC power usable by such AC element, and in another mode, as a rectifier capable fo converting AC power supplied by such AC element to DC power usable by such DC element, with said switching devices being commonly operable in both of said modes, and
   signal means capable of providing pulse with modulated, synchronous control of each of said switching devices, whereby said AC power is pulse width and duty cycle dependent.

2. The circuit of claim 1 in which such AC element is active, wherein said signal means are phase-lockable to such active AC element.

3. The circuit of claim 1 in which such AC element is reactive, wherein said converter means is capable of being used with such reactive AC element of any power factor.

4. The circuit of claim 1, wherein said signal means are responsive to the RMS value of said AC power supplied to such AC element in such a manner as to increase the average pulse width controlling said switching devices if said value falls below a first predefined level, and to decrease the average pulse width controlling said switching devices if said value exceeds a second predefined level.

5. The circuit of claim 1, wherein said signal means are provided by a programmable memory device containing digital waveshape-defining attributes.

6. The circuit of claim 1, wherein said signal means are responsive to a predefined no-load condition, for controllably limiting said duty cycle so long as said no-load condition prevails.

7. The circuit of claim 1, further comprising a protection circuit, dynamically responsive to a predefined overcurrent condition of said switching devices, for controllably limiting said pulse width, whereby said AC power is dynamically clamped so long as said overcurrent condition prevails.

8. A switching power converter circuit usable with a DC element having a pair of terminals and with an AC element that may be active comprising:
   a transformer having a primary coil and a secondary coil having two end taps, said primary coil having a center tap and two end taps, said center tap being connectable to one of such DC element terminals;
   switch means, responsive to switch control signals, said switch means including diode means shunted across transistor means, said switch means controllably, alternately connecting either of said primary coil end taps to such other DC element terminal;
   current storage means having a pair of input terminals and a pair of output terminals for storing current supplied by such DC element and such active AC element;
   plural bidirectional switch means, responsive to switch control signals, each including dual anode-connected series diode means shunted across transistor means, said bidirectional switch means controllably operatively connecting said secondary coil end taps to the two input terminals of said current storage means and, alternately, to one another in such a manner that the two input terminals of said current storage means are connected to one another; and
   switch controller means capable of supplying said switch control signals to said switch means and said plural bidirectional switch means, whereby said circuit acts in one mode as an inverter, capable of converting DC power supplied by such DC element to AC power usable by such AC element, and another mode as a rectifier capable of converting AC power supplied by such AC element to DC power usable by such DC element, with said bidirectional switch means being commonly operable in both of said modes.

9. The circuit of claim 8, wherein said circuit is operable with an active AC element of any power factor.

10. The circuit of claim 8, wherein said switch controller means are phase-lockable to such active AC element.

11. The circuit of claim 8, wherein said switch controller means provide pulse width modulated control of said switch means and said bidirectional switch means, whereby said AC power is pulse width and duty cycle dependent.

12. The circuit of claim 11, wherein said signal means are responsive to the RMS value of AC power supplied to such AC element in such a manner as to increase the average pulse width controlling said switching devices if said value falls below a first defined level, and to decrease the average pulse width controlling said switching devices if said value exceeds a second predefined level.

13. The circuit of claim 11, wherein said switch controller means are provided by a programmable memory device containing digital waveshape-defining attributes.

14. The circuit of claim 11, wherein said switch controller means are responsive to a no-load condition for controllably limiting said duty cycle so long as said no-load condition prevails.

15. The circuit of claim 11, further comprising a protection circuit, dynamically responsive to a predefined overcurrent condition of said first switch means and said bidirectional switch means controllably limiting said pulse width, whereby said AC power is dynamically clamped so long as said overcurrent condition prevails.

16. The circuit of claim 8, wherein said bidirectional switch means are electrically isolated from such DC power elemeht and from each other by independent secondary windings of said transformer.

17. The circuit of claim 8, wherein said circuit, when acting in another mode as a rectifier, provides full wave rectification of such AC power supplied by such AC element.

18. A switching power converter circuit usable with a DC element that may be active and with an AC element that may be active, comprising:
   selectively bidirectionally operative power converter means having signal controlled switching devices whose selected operations collectively configure said converter measn to act, during one fraction of each cycle of suc AC element, as an inverter capable of converting DC power supplied by such active DC element to AC power usable by such AC element and, during another fraction of each cycle of such AC element, as a rectifier capable of converting AC power supplied by such active AC element to DC power usable by such DC element, with said switching devices being commonly operable during both of said fractions of each cycle of such AC element;
   signal means capable of providing pulse width modulated, synchronous control of each of said switching devices, whereby said AC power and said DC power are pulse width and duty cycle dependent; and
   means for phase locking said signal means to such active AC element.

19. The circuit of claim 18, wherein said signal means are responsive to a predefined non-load condition, for controllably limiting said duty cycle so long as said non-load condition prevails.

20. The circuit of claim 18, further comprising a protection circuit, dynamically responsive to a predefined overcurrent condition of said switching devices, for controllably limiting said pulse width, whereby said AC power is dyamically clamped so long as said overcurrent condition prevails.

* * * * *

UNITED STATES PATENT AND TRADEMARK OFFICE
CERTIFICATE OF CORRECTION

PATENT NO. : 4,742,441
DATED : May 3, 1988
INVENTOR(S) : Steven C. Akerson

It is certified that error appears in the above-identified patent and that said Letters Patent is hereby corrected as shown below:

In the Claims:

In claim 1, line 7, change "fo" to --of--; line 10, change "fo" to --of--; line 14, change "with" to --width--.

In claim 16, line 3, change "elemeht" to --element--.

In claim 18, line 7, change "measn" to --means--; line 8, change "suc" to --such--.

In claim 19, line 2, change "non-load" to --no-load--; line 4, change "non-load" to --no-load--.

Signed and Sealed this

Eighteenth Day of October, 1988

*Attest:*

DONALD J. QUIGG

*Attesting Officer*   *Commissioner of Patents and Trademarks*